Figure 3:
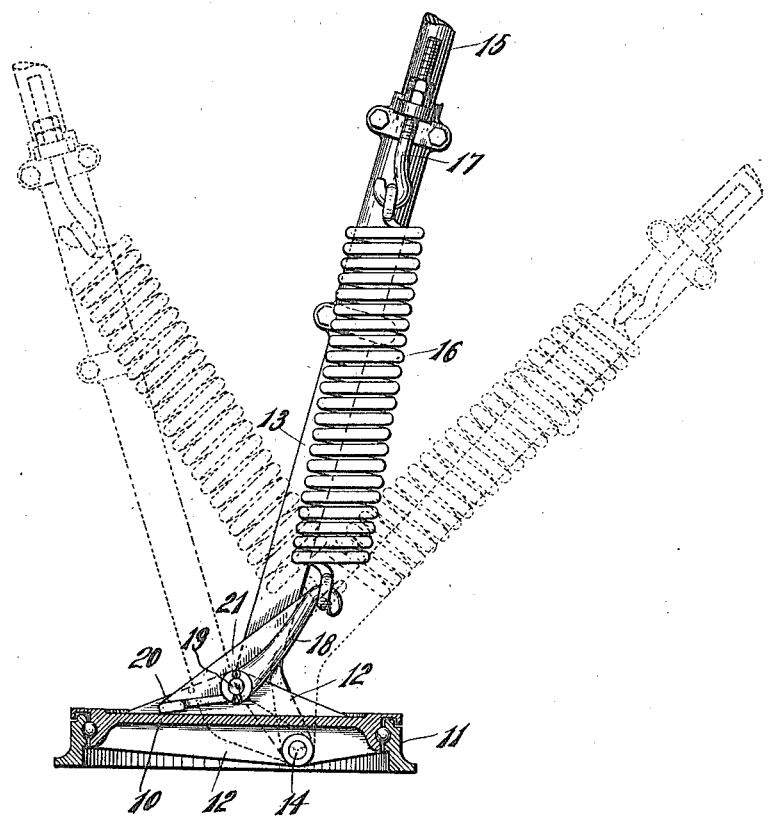

F. A. WASSON.
TROLLEY POLE.
APPLICATION FILED MAR. 25, 1916.
1,221,250.
Patented Apr. 3, 1917.
2 SHEETS—SHEET 1.
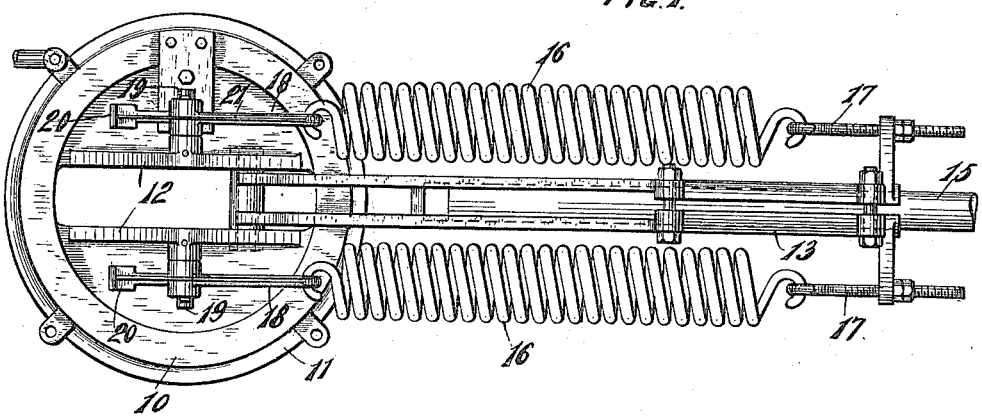
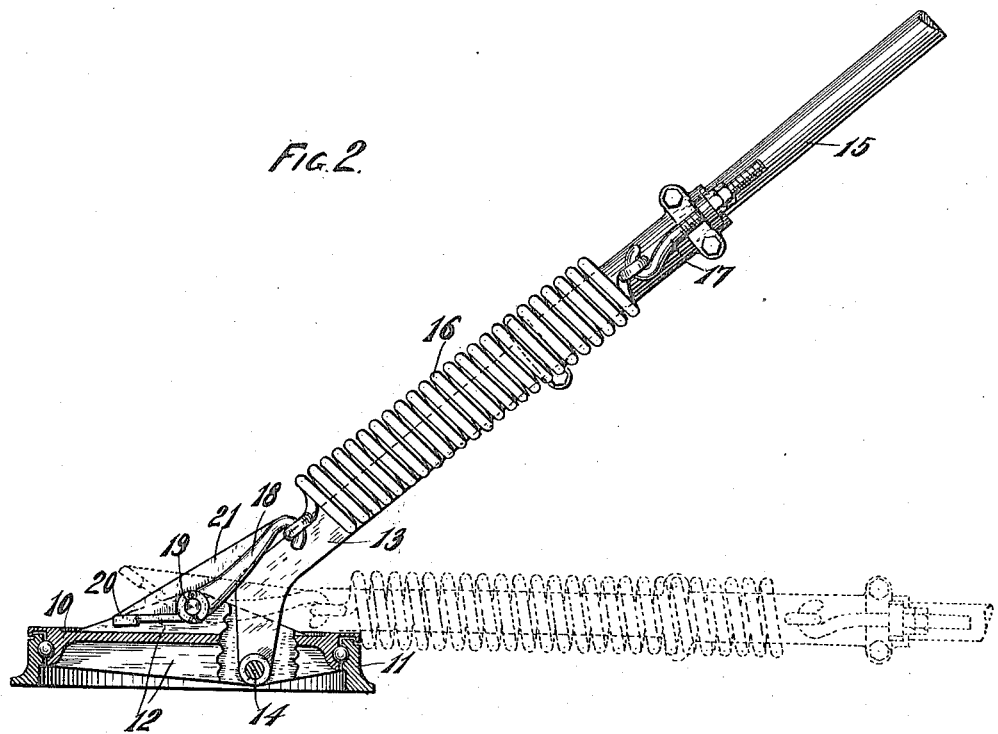
WITNESSES.
INVENTOR.
Frank A. Wasson
By R. S. Caldwell
ATTORNEY

F. A. WASSON.
TROLLEY POLE.
APPLICATION FILED MAR. 25, 1916.

1,221,250.

Patented Apr. 3, 1917.
2 SHEETS—SHEET 2.

UNITED STATES PATENT OFFICE.

FRANK A. WASSON, OF MILWAUKEE, WISCONSIN, ASSIGNOR TO WASSON ENGINEERING & SUPPLY COMPANY, OF SANTA ROSA, CALIFORNIA, A CORPORATION OF CALIFORNIA.

TROLLEY-POLE.

1,221,250. Specification of Letters Patent. Patented Apr. 3, 1917.

Application filed March 25, 1916. Serial No. 86,538.

*To all whom it may concern:*

Be it known that I, FRANK A. WASSON, a citizen of the United States, and resident of Milwaukee, in the county of Milwaukee and State of Wisconsin, have invented new and useful Improvements in Trolley-Poles, of which the following is a description, reference being had to the accompanying drawings, which are a part of this specification.

This invention has for its object to provide a trolley pole which will forcibly bear against the trolley wire to maintain electrical connection therewith and which will yield to accommodate the changes in elevation of the trolley wire, but which will have its motor spring so arranged as to overcome the usual tendency to swing the trolley pole past the vertical position and down against the roof of the car when the trolley pole leaves the wire accidentally.

An object of the invention is to so arrange the motor spring of the trolley pole that it will cease to exert its spring action on the trolley pole when the latter has moved a short distance above its normal angular position and before it reaches the upright or vertical position, and a continued movement of the trolley pole will be resisted by said spring.

With the above and other objects in view the invention consists in the trolley pole as herein claimed and all equivalents.

Referring to the accompanying drawings, in which like characters of reference indicate the same parts in the different views, Figure 1 is a plan view of a trolley pole constructed in accordance with this invention, the upper end of the pole being broken away;

Fig. 2 is a side view thereof with the base sectioned and the parts in their normal positions in full lines and in their lowermost positions in dotted lines; and, Fig. 3 is a similar view with the parts in other positions.

In these drawings 10 indicates the trolley base which is rotatably mounted in a base ring 11 and is provided with a central opening with vertical flanges 12 on either side thereof to form bearings for the trolley pole holder 13 which, being fulcrumed at the point 14 below the level of the base proper, is given an angular formation to permit it to be drawn to the horizontal position, shown by dotted lines in Fig. 2, when not in use.

The usual trolley pole 15 provided with a suitable current collector, not shown, is carried by the trolley pole holder 13, and coil springs 16 have their uper ends connected to suitable adjusting hooks 17 on the holder 13 while their lower ends are engaged with hook arms 18 which are pivotally mounted at 19 on the flanges 12.

The hooks 18 have stop lugs 20 formed thereon as extensions of the main hook portion, and the hook and extension are preferably provided with a strengthening rib 21 on the upper part thereof. The stop lugs 20 which are preferably integral with the hooks 18 are adapted to engage the base 10 and limit the upward swing of said hooks to the position shown in Fig. 3. Such position, however, is not reached until the trolley pole is higher than its normal running position which is shown in full lines in Fig. 2. The pull of the springs 16 will cause the hooks 18 to extend directly toward the hooks 17 in any usual position of the trolley pole between its horizontal position and its normal position, both shown in Fig. 2, and until it reaches the position in which the stop lug 20 engages the base 10, which is the position shown in dotted lines at the right of Fig. 3. Thus when the trolley pole leaves the wire, the pull of the spring thereon does not continue throughout the greater part of its arc of movement so as to throw it forcibly against the roof of the car, but the hooks 18, becoming stationary when they reach the position shown in Fig. 3, cause the springs to cease their pulling action on the trolley pole when the latter reaches the full line position of Fig. 3 where the pivot connection 14 and the two ends of the spring are in direct alinement. Further movement of the trolley pole beyond this point, due to its momentum, will be resisted by the springs 16 which, because of the limitation to the movement of hooks 18 are required to quickly expand, and consequently the swing of the trolley pole will be limited to such a position as is shown by dotted lines at the left of Fig. 3. The swing of the trolley pole will thus be checked by the springs which actuate it and will be limited to a degree which will be harmless.

What I claim as new and desire to secure by Letters Patent is:

1. A trolley pole having a suitable pivotal mounting, a swinging arm having a stop for limiting its movements, and a spring connecting the trolley pole with the arm, said stop serving to limit the movements of the arm beyond the swing thereof due to the movements of the trolley when engaged with the trolley wire.

2. In a trolley, a base, a trolley pole pivotally mounted thereon, an arm also pivotally mounted on the base, a spring connecting the trolley pole with the arm, and a stop on the arm engaging the base to limit the swing of the arm.

3. In a trolley, a base, a trolley pole pivotally mounted on the base, a hook arm also pivotally mounted on the base, a coil spring connected to the trolley pole and engaged with the hook of the hook arm, and a stop lug on the hook arm for engaging the base and limiting the movements of the hook arm.

4. A trolley, comprising a base and a trolley pole pivotally mounted thereon, an arm also pivotally mounted on the base, a spring connected with the trolley pole and with the arm, and a stop for limiting the swinging movements of the arm when the trolley pole passes beyond its position for engagement with the trolley wire.

5. A trolley, comprising a suitably mounted rotatable base having an opening therein with vertical flanges at its edges extending above and below the level of the base, a trolley pole holder fitting between said flanges and pivotally connected therewith at a point below the level of the base, hooks on the trolley pole holder, springs connected with said hooks, hook arms engaged with the springs and pivotally mounted on the upstanding flanges above the level of the base, a stop lug projecting from each of the hook arms and adapted to engage the base when the trolley pole holder moves above its normal position, and a trolley pole mounted in the trolley pole holder.

In testimony whereof, I affix my signature, in presence of two witnesses.

FRANK A. WASSON.

Witnesses:
R. S. C. CALDWELL,
KATHERINE HOLT.

Copies of this patent may be obtained for five cents each, by addressing the "Commissioner of Patents, Washington, D. C."